United States Patent
Franken

(10) Patent No.: US 9,676,220 B2
(45) Date of Patent: Jun. 13, 2017

(54) DATA CARRIER WITH PERSONALIZABLE MAGNETIC AUTHENTICITY FEATURE

(71) Applicant: U-NICA Technology AG, Malans (CH)

(72) Inventor: Klaus Franken, Igis (CH)

(73) Assignee: U-NICA Technology AG, Malans (CH)

( * ) Notice: Subject to any disclaimer, the term of this patent is extended or adjusted under 35 U.S.C. 154(b) by 0 days.

(21) Appl. No.: 15/151,710

(22) Filed: May 11, 2016

(65) Prior Publication Data

US 2016/0335463 A1  Nov. 17, 2016

(30) Foreign Application Priority Data

May 12, 2015  (EP) .................................... 15167427

(51) Int. Cl.
| | |
|---|---|
| *G06K 5/00* | (2006.01) |
| *B42D 25/405* | (2014.01) |
| *B42D 25/41* | (2014.01) |
| *B42D 25/369* | (2014.01) |
| *G06K 19/06* | (2006.01) |

(52) U.S. Cl.
CPC ......... *B42D 25/405* (2014.10); *B42D 25/369* (2014.10); *B42D 25/41* (2014.10); *G06K 19/06187* (2013.01)

(58) Field of Classification Search
CPC .......... G06K 5/00; G06K 19/00; G06K 19/02; G06K 19/06; G06F 17/00
USPC .......................... 235/380, 375, 488, 487, 491
See application file for complete search history.

(56) References Cited

U.S. PATENT DOCUMENTS

| | | | | |
|---|---|---|---|---|
| 5,552,236 | A | * | 9/1996 | Ohtake .................. B05D 1/185 156/326 |
| 5,558,290 | A | * | 9/1996 | Sato ...................... A01K 89/015 242/313 |

(Continued)

FOREIGN PATENT DOCUMENTS

| | | |
|---|---|---|
| DE | 2907004 B1 | 8/1980 |
| DE | 102011116490 A1 | 4/2013 |

(Continued)

OTHER PUBLICATIONS

Bao, X, et al., Remarkably high-temperature spin transition exhibited by new 2D metal-organic frameworks, Chem. Sci., 2012, 3, 1629.

(Continued)

*Primary Examiner* — Edwyn Labaze
(74) *Attorney, Agent, or Firm* — The Webb Law Firm

(57) ABSTRACT

A data carrier having a magnetizable authenticity feature provided in the data carrier, which feature is personalizable under irradiation with a high-energy beam by changing physical and/or chemical properties. A magnetic feature is provided as a further personalizable second-level feature in a functional layer, which feature is based on an opto-magnetic process which permits writing of information, such that macroscopically measurable magnetism is brought about at the irradiated location, for example, by microscopic spin coupling of the metal-organic compounds which are arranged as complexes and give rise to a macroscopically measurable magnetism, based on supramolecular coupling of the spin of a molecule or a molecule structure.

13 Claims, 2 Drawing Sheets

(56) References Cited

U.S. PATENT DOCUMENTS

| | | | | |
|---|---|---|---|---|
| 2004/0007625 | A1* | 1/2004 | Kappe | B41M 3/14 235/487 |
| 2005/0102464 | A1* | 5/2005 | Fannasch | G06K 1/126 711/1 |
| 2006/0198998 | A1* | 9/2006 | Raksha | G02B 5/09 428/323 |
| 2008/0090726 | A1* | 4/2008 | Eskra | B41M 5/385 503/207 |
| 2008/0250954 | A1* | 10/2008 | Depta | B41M 3/14 101/170 |
| 2011/0163088 | A1* | 7/2011 | Besling | H04L 9/3278 219/660 |
| 2013/0042966 | A1* | 2/2013 | Look | B32B 37/12 156/227 |
| 2013/0200606 | A1* | 8/2013 | Omar | B41M 3/14 283/74 |
| 2015/0132855 | A1* | 5/2015 | Martin | G01N 21/78 436/20 |
| 2016/0258114 | A1* | 9/2016 | Firth | B82Y 20/00 |

FOREIGN PATENT DOCUMENTS

| | | |
|---|---|---|
| DE | 102011116491 A1 | 4/2013 |
| DE | 102013005839 A1 | 10/2014 |
| EP | 1008459 A1 | 6/2000 |
| EP | 1322478 A1 | 7/2003 |
| EP | 1511012 A1 | 3/2005 |
| EP | 1574359 A2 | 9/2005 |
| WO | 0115910 A2 | 3/2001 |
| WO | 0226507 A1 | 4/2002 |
| WO | 2012062505 A1 | 5/2012 |

OTHER PUBLICATIONS

Boillot, M.-L., et al., First ligand-driven light-induced spin change at room temperature in a transition-metal molecular compound, New J. Chem. 1999, 179-183.

Bonhommeau, S., et al., One Shot Laser Pulse Induced Reversible Spin Transition in the Spin-Crossover Complex [Fe(C4H4N2){Pt(CN)4}] at Room Temperature, Angew. Chem., 2005, 117, 4137-4141.

Bornholdt, C. (Dissertation, "Ligandgetriebener lichtinduzierter Spin-Crossover in Einzelmolekülen bei Ramumtemperatur", Christian-Albrechts-Universitat zu Kiel, 2008.

Bushuev, M.B., et al, Unprecedented bistability domain and interplay between spin crossover and polymorphism in a mononuclear iron(11) complex, Dalton Trans. 2014, 43, 3906.

Clemente-Leon, M., et al., Multifunctional Magnetic Materials Obtained by Insertion of Spin-Crossover Fe complexes into Chiral 3D bimetallic Oxalate-Based Ferromagnets, American Chemical Society 2011, 9122-9130.

Decurtins, S., et al., Light-Induced Excited Spin State Trapping in a Transition-Metal Complex: The hexa-1-Propyltetrazole-Iron (II) Tetrafluroborate Spin-Crossover System, Chemical Physics Letters, vol. 105, No. 1, Mar. 2, 1984, 1-4.

Hauser, A., et al., Light-Induced Excited Spin State Trapping (Liesst) In [Fe(2-mephen)3]2+ Embeded in Polymer Matrices, Chemical Physics Letters, vol. 152, No. 6, Nov. 25, 1988, 468-472.

Lara, F. M., et al., Enhanced bistability by guest inclusion in Fe(II) spin crossover porous coordination polymers, Chem. Commun., 2012, 48, 4686-4688.

Ohkoshi, S., et al., Light-induced spin-crossover magnet, Nature Chemistry, vol. 3, Jul. 2011, 564-569.

Roubeau, O., et al., Formation, Structure, and Morphology of Triazole-Based Langmuir-Blodgett Films, American Chemical Society, Langmuir 2007, 23, 3110-3117.

Sato, O., et al., Multifunctional Materials Combining Spin-Crossover with Conductivity and Magnetic Ordering, Spin-Crossover Materials: Properties and Applications, First Edition, 2013, 303-319.

Weber, B., et al., An Iron (II) Spin-Crossover Complex with a 70 K Wide Thermal Hysteresis Loop, Agnew. chem. Int. , 2008, 47, 10098-10101.

\* cited by examiner

DATA CARRIER WITH PERSONALIZABLE MAGNETIC AUTHENTICITY FEATURE

CROSS-REFERENCE TO RELATED APPLICATION

This application claims priority to European Patent Application No. 15 167 427.2 filed May 12, 2015, the disclosure of which is hereby incorporated in its entirety by reference.

BACKGROUND OF THE INVENTION

Technical Field

The present invention relates to a data carrier, in particular a plastics card, having a magnetic authenticity feature provided in the data carrier, which feature is personalizable under irradiation with a high-energy beam, for example a laser beam or an electron or neutron beam, by changing physical and/or chemical properties.

Description of Related Art

Data carriers in the form of identity cards, personalization sheets or inlays for passports or credit cards and similar plastics cards nowadays must have a high protection against forgery. There are a large number of very different security features and special printing methods which can ensure such protection against forgery to a certain extent. A major challenge here is not only the provision of individualized security features, but in particular of security features which are combined, as it were, with the personalization and/or are a part thereof, that is to say are individualizable. The easy availability of laser systems and their extended fields of application within the context of document security suggest their use for a secure personalization method. The currently available laser technology is used in practice only to generate images such as portraits and graphic symbols, lettering and the like.

DE 2907004 A discloses, for example, that images in identity cards, but of course also other visually detectable information such as characters, patterns etc., can be generated with a laser beam. In that specification, the functional layer, from which the final image or any visible symbol or character is generated in the course of the method, consists of a thermosensitive layer. This functional layer extends over the card on an area segment on which the image or other visually detectable information is going to be located. The functional layer is typically located in a composite with other plastics layers, from which the finished card is produced in the course of the card manufacturing as a foil laminate. In this case, the image is burnt in, wherein a darkening of the irradiated locations is a consequence of the intensity of the laser beam. Nowadays, black-and-white images or grayscale images are routinely produced in this way. The advantage of this method, also referred to as laser engraving, which was already recognized at an early stage, is the high protection against forgery and resistance against light and mechanical stress of cards that are manufactured in this manner, in particular if they consist of polycarbonate.

This is evidenced, for example, by EP 1 574 359 A or EP 1 008 459 A. Security documents which are produced using laser engraving on polycarbonate laminates meet international specifications for travel documents (ICAO Doc. 9303 Part III Volume I) or even exceed them. For a colour presentation, systems consisting of lasers having three different wavelengths are also currently used. The prerequisite is a functional layer in the data carrier that consists of a formulation with colouring components. The colouring components of different colour must together produce a colour space consisting of a plurality of, typically at least three, primary colours. For practical reasons, the primary colours cyan [C], magenta [M] and yellow [Y] are preferred. Conceivable are also other colours, however. The primary colours must additionally have an absorption spectrum that permits interaction with coloured laser light. In contrast to the previously mentioned method of carbonization of initially non-visible components, this method shows the coloration by bleaching, that is to say brightening, a colour that is visible before irradiation. Due to the visible mixing of the coloured components before irradiation, the substrate appears in a very dark, ideally black tone.

Such a method is described, for example, by WO 01/15910 A. The advantages of the further increased protection against forgery by way of a coloured presentation of the document owner in the case of the method described in that document and the products produced thereby are offset by disadvantages that limit its practical value. The authors describe how, using laser irradiation with a specific wavelength, colour bodies, colouring agents or pigments with a specific absorption spectrum are bleached such that the complementary colours remain. The method is therefore technically very complex and is substantially directed, like the laser engraving that produces black-and-white images, at a forgery-proof presentation of photographic images.

A different laser method which can produce forgery-proof colour images via deactivation of photosensitive colouring agents is proposed in WO 2012/062505 A. It is distinguished by the pigment-wise action of a single high-energy laser which in the pigment layer bleaches each individual pigment grain with microscopic precision after its position was photometrically ascertained in a previous method and, on this basis, a pigment map was established.

A different approach altogether (U.S. Pat. No. 7,793,846 B) is pursued by laser systems that operate in the near IR range. In this case, the particles having the colour bodies are brought into intimate contact with substances that absorb IR radiation, which substances heat up due to the absorption with specific laser radiation and thermally cause the neighbouring colour bodies to change colour.

DE 10 2011 116 491 A1 discloses a data carrier having a security element with microcapsules. The microcapsule comprises a capsule casing having a light-transmissive carrier medium and a large number of magnetic, opaque pigments. The light transmissivity of the microcapsules is reversibly intensifiable by the application of a magnetic field, since the magnetic field aligns the magnetic pigments such that the microcapsule appears in the colour of the substrate background when viewed in direct light, and since in the absence of the magnetic field, the magnetic pigments within the microcapsules are again distributed randomly such that an observer perceives the microcapsules in the actual colour of the magnetic pigment. The capsule casing can be damaged by electromagnetic radiation, as a result of which the carrier liquid exits the microcapsules and the pigments remain behind immovably in the damaged capsule casings. As a result, the microcapsules are irreversibly fixed in an opaque state.

One method for producing an optically variable security element having a microcapsule-based colour layer with a motive region is disclosed in DE 10 2011 116 490. Provided there is a printing ink that contains a large number of microcapsules, in the capsule casing of which a carrier liquid and a magnetically reversibly alignable pigment are enclosed. In a partial region of the colour layer containing the motive region, an external magnetic field is applied so as to align the rotatable pigments in the microcapsules there.

The capsule casings in the motive region are damaged by electromagnetic radiation, such that the carrier liquid exits the microcapsules and the pigments remain behind immovably in the damaged capsule casings and thus present the motive of the security element.

All the abovementioned methods are based on the motivation of producing a visible security feature. In the technical field of document security, however, a plurality of security levels are defined of which the visible features and other features which are perceivable by human senses present only one of three security levels, in the form of first-level features. The second security level subsumes features which are detectable with simple technical means, i.e. with smaller, portable devices. In the simplest case, this could be a UV lamp or a laser pointer. The third level features are more complex in nature and are verifiable with forensic means. The different security levels serve for rounding off the entire document security.

In order to comply with this requirement, EP 1 322 478 B1 proposes the generation of a feature that is visible in UV light, is based on the laser-induced bleaching process and appears to the observer as dark cutouts on a fluorescent surface element. The laser light or different high-energy radiation, such as for example an electron beam, thus deactivates a luminescent authenticity feature at selected locations. The visible image impression corresponds to that of a negative image or negative lettering. This feature allows authentication of a security document with simple means, such as a UV lamp, but has limited value to the extent that the UV-active layer could also be covered by print and thus simulate the visual impression under UV light. UV-active layer in the context of this invention is understood to mean a layer that exhibits fluorescence under irradiation with UV light. This definition should be delimited clearly from a layer that polymerizes or cures under the action of UV light, which applies to printing technology terminology in the case of what are known as UV inks. A forgery that is produced by a UV active layer being covered with print instead of being photochemically deactivated could be detected microscopically, but this would again elevate this feature to a forensic level.

EP 1 511 012 furthermore discloses an authenticatable magnetic recording medium and a method and a system for authenticating this recording medium. DE 10 2013 005839 relates to a security element having magnetic coding of magnetic coding elements having magnetic anisotropy.

SUMMARY OF THE INVENTION

One advantage of the method according to EP 1 322 478 is the efficiency with respect to handling, reliability, costs. It was recognized that there is also the possibility of combining the laser-based fluorescence extinguishing with other personalization methods based on laser technology. In practice, second-level features are required wherever quick authentication of the document is necessary. This typically applies to border posts or access control to the gate area of an airport. The combination of complementary features has proven advantageous at such control locations. In addition to the methods that make authentication under light of different wavelengths possible, methods on the basis of magnetic features have proven themselves as second-level features. For a long time, magnetic strips have been used for storing data sets, wherein the use thereof extends beyond the security application to the storing of smaller data amounts for commercial purposes, which is also used in customer cards, for example. Methods which can also capture magnetic imaging have established themselves in particular for security applications. A motive, for example an image, lettering or a barcode, can be easily applied on the security document using magnetic ink and thus be detected. A magnetic security thread can also be detected, for example, using such a scanning method. Magnetic image capturing devices are offered, for example, by Regula-Rus CJSC, Moscow, or Matesy GmbH, Jena. The magnetic imaging methods can be used as second- or third-level methods, depending on the type of embodiment of the detection devices.

Documents for proving the identity of their owner are not only examined in terms of the genuineness of the document, but additionally have features which are characterizing of the owner of the document. There must therefore be the latent possibility to individualize the document to match its carrier. This is a requirement which is typically met by way of a portrait. A purely visual comparison between the image of the carrier in the document and his face can be considered secure only to a limited extent. Biometric methods promise more reliable identification, but are accompanied by a complexity which is not practical for most control locations. Second-level features, however, offer a good compromise between manipulation security and examination complexity.

The simple print of personalized or individualized data of such second-level features onto the surface of the ID document or ID card, as for example a print using magnetic ink, requires not only the generation of the portrait using a laser method, but also an additional printing method. The printing operation not only constitutes additional effort, but it can subsequently be applied to the card easily and therefore cannot be considered secure. Magnetic ink is also not a purely second-level feature, since its print is perceivable with the naked eye.

There is therefore a demand for a laser method for personalizing not only the image—with or without a digital watermark—but also the card or document outside the image in a non-visible manner or in a manner which cannot be perceived using the senses. There is therefore a demand for a method for applying both an image presentation and also further non-visible data onto the security document if possible in one operation. EP 1 322 478 offers a supply for this demand, achieving the object with a second-level feature that is visible in UV light. However, UV features are not very subtle. For a potential counterfeiter, it is routine, as it were, to uncover UV features in a document so as to then imitate them. The feature claimed in EP 1 322 478 represents negative lettering which naturally has a background from which it can be distinguished. However, this is not always desirable with respect to the freedom of the layout of the card or document.

It is therefore an object of the present invention, starting from EP 1 322 478 B1, to provide personalization with a high degree of reliability and the possibility of later verification of said personalization, which can be carried out both efficiently and quickly and has a higher complexity than a UV feature, and is yet at the same time verifiable using common means and, if possible, does not limit freedoms of layout.

The object is achieved such that, first, a laser or a combination of lasers suffices as the personalization instrument for the image production and the application of further individual data with all the advantages according to the prior art, and also a magnetic feature, and thereby a feature which is more valuable compared to a fluorescence feature, is used as a personalizable second-level feature. The magnetic feature can additionally be produced actively, in contrast to the method according to EP 1 322 478 does not consist of an extinguishing operation of an already existing feature carrier. The magnetic feature is the result of an opto-2 magnetic process which allows writing of information. For designing the visible and also the visually not identifiable layouts, the method according to the invention permits maximum freedoms. The laser method also has the advantage that personalization is also possible on the data carrier which is prepared with pigments and magnetizable materials through transparent covering layers, which makes the protection against forgery of a higher order.

Achieving some advantages comprise the property, as is necessary, of generating the magnetism with the same tool as the image, wherein the tool may be an energy beam according to the object.

The security feature can here also be used as a further personalizable second-level feature.

The carriers of a magnetization which are used for magnetic security features according to the prior art are, in contrast to mostly organic fluorescent dyes, of an inorganic nature, for example iron, cobalt, nickel, gadolinium and rare-earth-doped iron metals, doped manganese oxide, magnetic perovskite, iron(II, III) oxide (magnetite), $SmO_5$, alloys such as Heusler phases etc., and cannot have their magnetic effect taken away photochemically through the action of electromagnetic radiation. In the relevant nature, the term atomic magnets is also used for these metal magnets. Typical for example is magnetic ink on the basis of magnetite having a grain size of between 2 nm and 20 nm, so as to impart a macroscopically measurable magnetism to a non-magnetic substrate such as paper or a polymer. Demagnetization of these magnets made of inorganic material is possible by applying a coercivity field, but this does not mean that the ferromagnetism of the substrate disappears irreversibly. Rather, the ferromagnetism disappears reversibly. Re-magnetization is possible at any time by applying a corresponding field. This magnetization is realizable below the Curie temperature.

The basis of magnetism as a macroscopic phenomenon is the interaction of many electrons with unpaired spin, wherein a minimum number of electrons having the same spin is necessary (cooperative effect). A measurable remanence and thus ferromagnetism, or ferrimagnetism in the case of molecular magnets, cannot occur in isolated radicals or for example also unpaired electrons of a single molecular coordination compound, if the spin-spin interaction between the unpaired electrons is only small or not present at all. The transition from paramagnetism to ferromagnetism or ferrimagnetism presupposes a spin-spin coupling which extends over a sufficiently high number of electrons and has a sufficiently large spatial extent. The quantum mechanical prerequisites demand among other things a minimum proximity between the unpaired electrons having the same spin. Since thermal influences directly influence the remote action of the spins of the unpaired electrons, there are limit temperatures above which no sufficient coupling and thus no macroscopic magnetism exist anymore. The corresponding temperature values, which in the case of ferromagnetism are referred to as Curie temperatures, are specific material constants for every magnetic material. For practical applications, in particular applications in the field of ID documents, only Curie temperatures above room temperature are practical. For classical magnetic substances, Curie temperatures ($T_c$) in a usable order of magnitude, such as for example for Fe 768° C., Co 1121° C., Ni 360° C., SmCo 750° C., $Fe_2O_3$ 450° C. or NdFeB 300° C., are relevant. Known magneto-optical storage methods use Curie temperatures to heat the magnetic base material above its Curie temperature through the action of a laser at a specific site of the storage medium and to thus delete the information located thereon. Re-magnetization is suitable for storing new data sets on the same storage medium. Classical methods are not suitable for achieving the object, since they are not compatible with other desired security features, the manufacture thereof or the carriers of the security features. One of the reasons is that the Curie temperature of an inorganic magnet nowadays is significantly above the temperature which a security document withstands.

Data carriers of any type, in particular plastics cards, having authenticity features introduced in the card composite are thus provided which are personalizable under irradiation with a high-energy beam, for example a laser beam or an electron or neutron beam. The personalizable authenticity features comprise or consist of at least one activatable component which, after activation with an energy beam, has a macroscopically measurable magnetism at the irradiated location. This magnetism results from the collective interaction of many magnetic centres and can be detected well using, for example, conventional magnetometers, for example fluxgate magnetometers. By contrast, microscopic, locally occurring magnetism with non-coupled centres can be measured, for example using electron spin resonance (ESR) or a SQUID magnetometer, but cannot be considered macroscopic within the meaning of the invention. The at least one magnetizable component must be applied or incorporated on or in the data carrier wherever a magnetic sequence of characters (letters, numbers, barcodes), a magnetic image or any other magnetically detectable information is intended to appear during the subsequent authentication of the document. The magnetically detectable information can contain any digital information which is correspondingly readable.

According to the embodiments which are explained further below, the authenticity features according to the invention can be provided, at a wide variety of possible locations and incorporation sites in the data carrier that serves for identification purposes. The magnetizable authenticity features can therefore be printed in the form of a printing ink on one specific or on a plurality of layers of the data carrier or be applied in a different way. The authenticity features can, however, also be incorporated in the plastics polymer of one or more layers of the data carrier. The magnetizable or magnetic authenticity features can also be incorporated in the adhesive, the varnish or as an additive in the plastics material. It is also conceivable to apply the feature according to the invention as sprayed deposition or to introduce it as part of a lamination sheet or a thin film into the document or to apply it thereto.

The card composite can have a cover layer and a carrier layer, wherein the cover layer can be arranged on that side of the data carrier which faces the radiation and which is translucent for the beam used.

The layer described in one embodiment, which is described here as a protective layer, can be located on a substrate or on a data carrier, for example made of paper or polymer, for example polycarbonate. Such a protective layer can surround the further layers of the data carrier that have the magnetic or magnetizable components. These protective layers can serve as primers, as protection for the substrate, for example in the form of opaque layers against the action of laser light on a sensitive substrate, such as for example paper, or carry graphical functions, for example carbonize under laser action, that is to say become black at the site of action of the laser radiation, or contain coloured pigments or colouring agents which in turn are bleached by laser light.

The magnetizable layer can extend over the entire area of the data carrier.

The activation of the magnetizable or magnetic component and the generation of visible lettering or of a visible image, such as for example the portrait image of the document owner, can be carried out by way of irradiation of the same type or even by the radiation with different types of beam or beam sources. When irradiated with different types of beam, the beam sources can be active at the same time or be used one after another for personalization purposes.

Due to its synergy with the laser-supported generation of visible images, the inventive solution is particularly attractive for the design of identification documents with image presentations, in particular as a second security feature. However, it is also conceivable to utilize the generation of magnetism with the aid of high-energy radiation per se as a manufacturing method for a first security feature, and this in particular also by itself.

The magnetic substance preferably has a Curie temperature above the room temperature.

The magnetizable or magnetic feature comprises or consists of molecular magnets which have an organic or metal-organic base and are organized in sufficiently large one-dimensional to three-dimensional structures so that ferromagnetism or ferrimagnetism can arise.

The known, purely organic ferromagnets have Curie temperatures that are near absolute zero and are therefore not suitable for practical use. Examples of this are the p-nitro-phenyl-nitronyl-nitroxide radical $T_c=0.6$ K, organically doped fullerene systems, e.g. TDAE Tc=16.1 K or the β phase of the dithiadiazolyl radical in $p$-$NC.C_6F_4.CNSSN$ with $T_c=35.5$ K, wherein these molecules exhibit macroscopically observable magnetism only in a supramolecular, spatial arrangement of the molecular arrangement. The purely organic molecular magnets are currently the subject of a very dynamic research area which in the medium term promises the realization of organic molecular magnets with Curie temperatures at room temperature or above. According to the state of the art, metal-organic substances, in particular the cyano complexes, promise better suitability within the meaning of this invention. The research in the area of organic magnets continuously receives new impetus from notable works such as for example on the magnetic complex $V[(Cr(CN)_6]_{0.86}*2.8H_2O$ with a Curie temperature of 315 K. Typical coercivity field strengths are in the order of magnitude of 1000 Oe or 80 KA/m, which fits well into devices that are available in this area and are suitable for control locations for visual presentation of magnetic fields. The prior art mentions—even if tentatively—metal-organic compounds that have coercivity field strengths that lie far beyond in the region of the SmCo with 17800 Oe, which thus already far exceed the requirements of this invention with respect to magnetizability. The ferrimagnetic complex $V(TCNE)_2*0.5CH_2Cl_2$ has a molecular saturation magnetization and Curie temperature, comparable to chromium dioxide, and a coercivity force which is relatively high with 60 Oe. At the same time, the tetracyanoethylene dimer anion radical having a strong absorption band of 533 to 535 nm gives reason to assume that the excitation with visible light, in particular laser light, with a corresponding wavelength destabilizes the π dimer and thus the radical. The sensitivity of the complex in air and under a thermal stress above 350 K relativizes its use as a molecular magnet, but it shows that stable derivatives or related complex compounds in a stabilizing formulation are suitable candidates for molecular magnets.

Macroscopic ferromagnetism or ferrimagnetism, as is useful in the inventive sense, goes beyond an isolated molecular magnetic interaction. The basis according to the invention can be traced back to the paramagnetism of metal-organic compounds, which in turn has its origin in the total momentum of the electronic system of these compounds. For metal-organic compounds or complexes, substantially the spin-only case is important for molecular magnetic interaction. For all the following observations therefore the total spin of the participating metal ions and the spin coupling of the electronic systems of said ions are relevant. The microscopic spin coupling of complex molecules and complex clusters in turn can give reason for a macroscopically measurable magnetism only if a far-reaching supramolecular coupling of the spin of a molecule or of a small molecule structure occurs. A ferromagnetic or anti-ferromagnetic coupling or interaction occurring inside a complex or complex cluster is therefore to be distinguished in terms of terminology from macroscopically measurable magnetism. Single molecule magnets (SMM) can have ferromagnetic spin couplings between a number of metal centres in the molecule or a limited molecule complex, but exhibit no ferromagnetism without a far-reaching supramolecular remote action. "Magnetizable" is understood to designate any diamagnetic complex in the LS state (low spin state). "Magnetic" can be understood to designate the HS state (high spin state) of the molecule. Laser excitation would then in turn have to be understood as "magnetization". Shin-ichi Ohkoshi et al. (Light-induced spin crossover magnet, Nature Chemistry 3 Jul. 2011, 564-569) for example have described an iron-niobium complex which has a strong anti-ferromagnetic interaction between iron and niobium after a LIESST-excitation. The spin systems of the nuclei are thus coupled, but owing to the different spin multiplicity of both metal ions, ferrimagnetism remains behind.

Spin coupling on a microscopic level can occur directly between a metal ion and a nearest metal ion of a multi-nuclear complex (direct exchange) or via bridging ligands (superexchange). Here, for example CN, N donor ligands or complex units such as $[Au(CN)_2]^-$ can act as bridging ligands. The gold cyanide complex ion in turn is able to build up three-dimensional networks that favour macroscopic coupling.

The interaction of the spins in neighbouring orbitals of metals or metals and ligands determines, depending on the orientation of the orbitals, whether the interaction is ferromagnetic or anti-ferromagnetic. The underlying mechanisms are known to the person skilled in the art. The exchange or superexchange paths thus have a direct relation to the chemical structure of a coordinate compound. The magnetic properties thereof can thus be brought about via a targeted molecule design.

Ferrimagnetism or ferromagnetism presupposes quasi a spatial superstructure, within which a magnetic coupling can propagate. According to the Weiss domains in the case of metallic magnets, organic or metal-organic magnets require anchoring in extended networks that ensure the optimum proximity of the spin centres with respect to one another and preferably have a periodic structure. This can be coordination polymers having a one-dimensional extent or more complex two-dimensional and three-dimensional networks. In the case of metal-organic compounds, such a system is also referred to as a coordination network or metal-organic framework (MOF). One known example of such a network—albeit not magnetic—is $Zn_4(1,4$-benzene dicarboxylate$)_3$ with a cubic superstructure. Such structures sometimes have very high thermal stability. The two-dimensional triazole-bridged complexes of the type $Fe(L)_2$ with HL=3-(2-pyridyl)-5-(3-pyridyl)-1,2,4-triazole, for example, has very high non-hysteretic transition temperatures of 326K and 501K ($t_{1/2}$) from diamagnetic to paramagnetic, wherein the complex itself remains stable up to 623K (Bao et al, Remarkably high-temperature spin transition exhibited by new 2D metal-organic frameworks (2012) Chem. Sci., 1629-1633). In oxalate-bridged networks, pronounced magnetic orders have been detected. The chiral complex $[Fe^{III}(5\text{-}Cl\text{-}sal)_2\text{-}trien][Mn^{II}Cr^{III}(ox)_3]*0.5(CH_3NO_2)$ exhibits ferromagnetism for example up to 5K and between 300K and 60K a change in the magnetic susceptibility corresponding to a partial SCO (Coronado et al., Multifunctional magnetic materials obtained by insertion of spin-crossover $Fe^{III}$complexes into chiral 3D bimetallic oxalate-based ferromagnets, Inorg. Chem., 50: 9122-9130). It is to be expected that such transitions can also be stimulated by light irradiation (LIESST effect). The spin crossover, with the consequence of magnetic ordering, can in very general terms occur in an anionic/cationic network (Osamu Sato et al., Multifunctional Materials Combining Spin-Crossover with Conductivity and Magnetic Ordering from Spin-Crossover Materials Properties and Applications, published by Malcom A. Halcrow, John Wiley & Sons (2013)). It is also conceivable to immobilize suitable coordination compounds on a surface, such as a film, for example PVA or PC, in a suitable order structure. Roubeau et al. report in Langmuir, 23:3110-3117 on the production of Langmuir-Blodgett films composed of substances having SCO properties.

The prior art knows a large number of molecular magnets on organic and metal-organic basis that give an indication that suitable derivatives should be able to be synthesized that would be suitable—presupposing a sufficiently high Curie temperature—as a second-level security feature.

The inventive solution rather contains as an essential element an authenticity feature which effects the formation of a magnetizable or magnetic property under the action of high-energy radiation, preferably electromagnetic radiation. Irradiation can occur with a wavelength to photochemically magnetize the magnetizable substance or additionally with a second wavelength to extinguish the magnetization again. Alternatively, extinguishing can also occur by way of heating, since starting from a specific temperature, such metal-organic systems relax back into the diamagnetic ground state.

The underlying mechanism for this switchable magnetic property is a photochemical spin crossover effect (SCO) which can occur in metal-organic compounds. A spin crossover is understood to mean the transition from a low spin state (LS) to a high spin state (HS). The transition from LS to HS, or vice versa in the case of an inverse SCO, can be stimulated by temperature, pressure, light, adsorption/desorption in host lattices, via a redox reaction. The light-induced form is preferred for the present invention. A thermal SCO can, however, also be used within the context of the invention if acting electromagnetic radiation secondarily triggers a thermal effect. A thermal SCO is not observable in every coordination compound. However, it usually occurs in compounds which already exhibit a LIESST effect. Thermal SCO transitions and a LIESST effect often occur together and can thus effect complex magnetic behaviour.

A light-induced SCO into a stable HS state can be achieved firstly directly by optical excitation of the metal d orbitals or is effected by the interaction between the metal nucleus of a complex and one or more photoactive ligands. Direct excitation of the metal orbitals is also referred to as a LIESST effect (light induced excited spin state trapping), while the ligand-driven variant is known as LD-LISC effect (ligand driven light induced spin crossover).

The LIESST effect was discovered first by Decurtins et al. on $[Fe(ptz)_6](BF_4)_2$ (ptz=1-propyltetrazol; Chemical Physics Letters 1984, 105, 1-4). In this example, excitation with green light corresponding to an absorption band at 515.5 nm, but also excitation with radiation in the NIR at 980 nm via intersystem crossing (IC) or an IC cascade leads to a metastable $^5T_2$ state (HS form), while irradiation with red light, corresponding to an absorption band at 820 nm, transitions the complex via excitation into the $^5E$ state and via a subsequent relaxation back into the ground state ($^1A_1$ state) and thus into the LS form. In this case, the LIESST process is possible only at cryogenic temperatures, as in most known cases. It is true for most known photostimulable spin transitions that LIESST transitions take place at temperatures below 50 Kelvin and the $^5T_2$ state is populated quantitatively by a pumping effect, as it were, with the HS form for example in the case of octahedral nuclear complexes. The development of the specialist field now leads to an area that is usable for practical application according to the invention, as was shown by Real et al. using the example of $[Fe(pyrazine)\{Pt(CN)_4\}]$ (Angew. Chem. 2005, 117 (26), 4137-4141). In this example, the transition takes place completely with a laser pulse, wherein a broad hysteresis of approximately rectangular shape is near room temperature. The complex can be kept for months at room temperature, theoretically without limit, which is important with respect to a lifetime of 1 to 20 years, preferably 5 to 10 years, that is required for a security document. This shows that with a suitable molecule design, the LIESST effect and its inverse form are practical for achieving the object according to the invention. For use of the LIESST-capable complexes according to the invention, it is furthermore beneficial to provide them in a suitable form for further processing. For example, the embedding of a complex suitable for the LIESST effect in polymer matrixes, already described in 1988 by Hauser et al. (Chem. Phys. Lett., 1988, 152, 468), shows that such coordination compounds or entire coordination networks can be applied onto carriers or introduced into carriers which are suitable directly for the manufacture of security documents, such as for example ID cards, while functionally maintaining their opto-magnetic properties.

The SCO with a thermal hysteresis can likewise lead to the object being achieved, specifically if, in a broad hysteresis near room temperature, via the thermal action of an energy beam, preferably a laser beam, for example of a laser which typically operates in NIR, the security document in the LS state of the carrier of the magnetic feature is heated with the laser in a controlled fashion at locations where a personalization is intended to be created. Since in SCO materials the hysteresis range typically occurs at low temperatures, in these cases activation of the magnetism must take place in a correspondingly cold environment. The elaborate conditions of such magnetization can be considered to be a further security advantage. Between the magnetized and non-magnetized state, it is possible to switch to and fro as often as necessary by heating with the laser and cooling in a suitable apparatus. SCO complexes with sufficiently broad hysteresis loops are conceivable. Interesting examples were suggested by Weber et al. (An Iron(II) Spin-Crossover Complex with a 70 K Wide Thermal Hysteresis Loop, Angew. Chem. Int. Ed., 2008, 47, 10098-

10101) and by Bushuev et al. (Unprecedented bistability domain and interplay between spin crossover and polymorphism in a mononuclear iron(II) complex, *Dalton Trans.*, 2014, 43, 3906-3910). Real et al. (Enhanced bistability by guest inclusion in Fe(II) spin crossover porous coordination polymers, *Chem. Commun.*, 2012, 48, 4686-4688) demonstrate in an example of an MOF that three-dimensional structures can also have a broad hysteresis, in this case 60 K, centred around and in particular slightly below room temperature, for example at about 240 K, and thus cooperative coupling to a macroscopically measurable magnetism is possible. The hysteresis thus lies between 210 K and 270 K.

A further option for achieving the object according to the invention is provided by the ligand-driven SCO. For example, specific iron complexes with styrylpyridine ligands are known for being able to transition from the trans-configuration into the cis-configuration by light-induced repositioning and in the process transition from an LS state into a HS state. Below 163 K, however, the trans-form exhibits thermal SCO, which is associated with a massive increase in the susceptibility. Also known are ligand-driven systems which have SCO at room temperature. The complex [Fe(trans-msbpy)$_2$(NCS)$_2$] has SCO between 264 and 380 K, while it is nearly diamagnetic at RT (trans-msbpy=4-methyl-4'-trans-styryl-2,2'-bipyridine; M.-L. Boillot et al., New. J. Chem 1999, 23, 179-184, First ligand-driven light-induced spin change at room temperature in a transition-metal molecular compound). In this case, the hysteresis range lies in a temperature range that is too high for an application according to the invention, but this shows that a practical temperature range can be created via a suitable molecule design. Promising systems are also those where a photoswitchable ligand changes the coordination number and in this way brings about a HS state or LS state. For example, C. Bornholdt describes (Dissertation, "Ligandengetriebener lichtinduzierter Spin-Crossover in Einzelmolekülen", Christian-Albrechts-Universität in Kiel, 2008) bistable systems on nickel basis which can be switched under irradiation with 365 nm or 440 nm.

BRIEF DESCRIPTION OF THE DRAWINGS

Preferred embodiments of the invention are described below with reference to the figures which serve merely for explanation and are not to be interpreted as limiting. In the figures.

DESCRIPTION OF PREFERRED EMBODIMENTS

Figure 1:
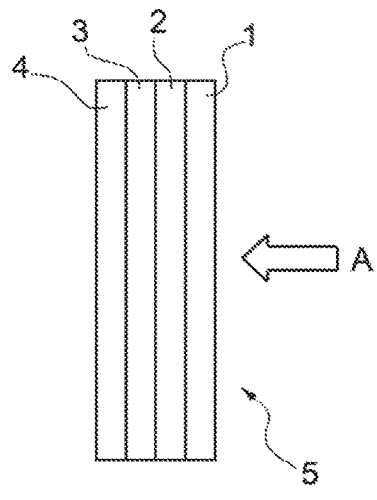
FIG. 1 shows a schematic lateral view of a surface element of a security document according to one exemplary embodiment of the invention.
Figure 2:
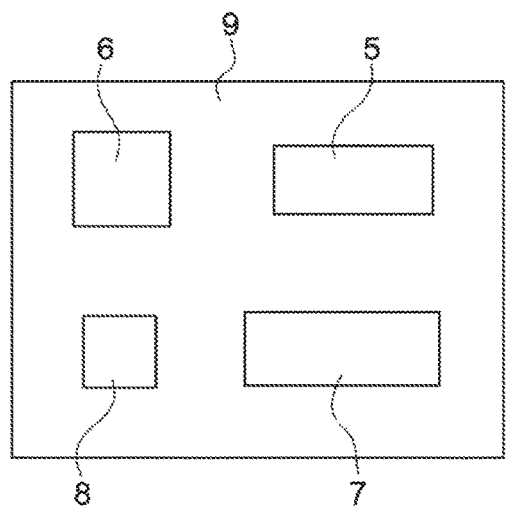
FIG. 2 shows a plan view of a data carrier with a surface element of a security document according to FIG. 1.

FIG. 1 shows a schematic lateral view of a surface element 5 of a security document 9 according to one exemplary embodiment of the invention, and FIG. 2 shows a plan view of a data carrier with a surface element 5 of a security document 9 according to FIG. 1.

FIG. 1 thus shows the layer sequence in the structure of the relevant part of the security document 9. This may also be a section of a security document 9, for example the cross-section of a portion that is inserted in a cutout provided in a substrate, similar to a chip in a data carrier.

Starting from the side A, the side facing the viewer, the layer sequence is as follows: the cover layer 1, which is transparent for stimulating laser radiation in the visible range and in the adjacent UV and IR ranges, is followed by a functional layer 2, which contains the molecular magnets described further below. The functional layer 2 is arranged on a carrier layer 3, in particular a substrate, which is followed, if desired, by a layer 4 for supporting a cooling effect.

The planar data carrier is provided with a surface element 5, which is essential for the security document 9 and thus has a functional layer 2 containing molecular magnets, which functional layer 2 thus at least partially covers the security document 9. The surface element can in principle cover the entire data carrier. The data carrier furthermore has, for example in credit card format or a data sheet for a passport, a second surface element 6 which contains a visible portrait image, a third surface element 7 with a visible personalization and a fourth surface element 8 with a machine-readable personalization. The surface elements 6, 7 and 8 are optional and provided advantageously to increase the security. It is also advantageous in the present invention that the surface element 5 at least partially overlaps the surface elements 6, 7 and/or 8.

The functional layer 2 substantially comprises or consists of a specific amount of molecular magnets which adjoin one another in a suitable manner for sufficient magnetic coupling. It is not important here if this is a closed layer of molecules or if said molecules are joined by other compounds, as long as the magnetic coupling is not interrupted to such a degree that no macroscopically measurable magnetism is present anymore. The functional layer can thus also consist, for example, of a matrix of a polymer material, for example polycarbonate, which surrounds sufficiently large clusters of molecular magnets. It is even conceivable that the data carrier has a three-dimensional form by constructing it via a 3D printing method. A surface element, which is formed as desired, located therein and has molecular magnets in suitable assembly, in this case is understood to be the functional layer.

Figures 3, 4:
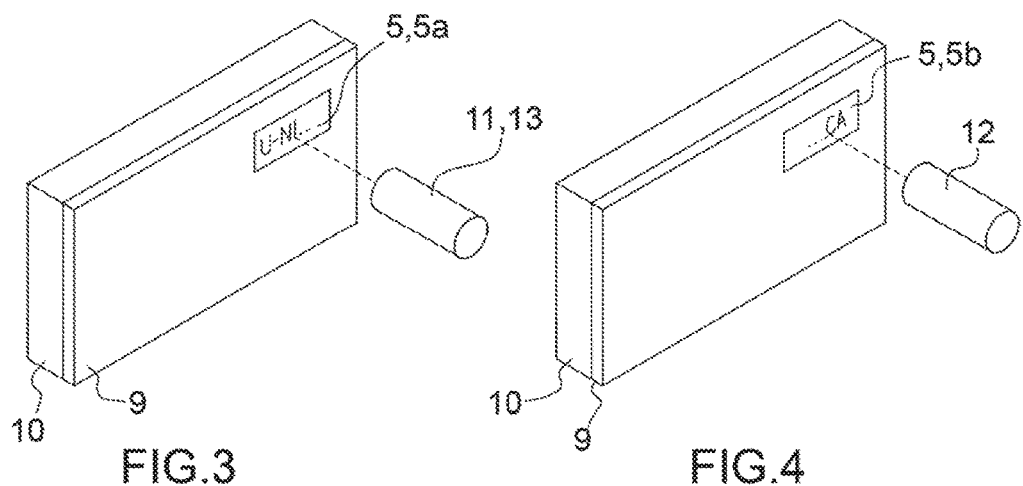
FIG. 3 shows a security document according to FIG. 2 during activation (magnetization) using a laser (writing operation or magnetic personalization)
FIG. 4 shows a security document according to FIG. 2 during the cancellation of the magnetization using a laser (extinguishing operation)

FIGS. 3 and 4 show a security document 9 according to FIG. 2 during activation (magnetization) by a laser (writing operation or magnetic personalization); and a security document 9 according to FIG. 2 during the cancellation of the magnetization by a laser (extinguishing operation).

The security document 9, for example an ID card based on polycarbonate, is here illustrated, for simplicity, only with the surface element 5 of the functional layer of molecular magnets. FIG. 3 illustrates a first laser 11, which is the at least one first laser for generating the HS state via the LIESST path. The light beam of the first laser 11 penetrates the transparent cover layer 1 (not illustrated here) without any significant interaction and acts on the molecular magnets so as to add the "C" to the already established letters "U-NI". This is therefore a partially complete magnetization 5a.

The first laser is additionally provided with the reference sign 13 since it is possible in an alternative to the first laser 11 to have at least a first laser 13 for producing the HS state by way of thermal SCO.

The reference sign 10 illustrates a cooling apparatus 10 arranged below, opposite the viewing direction A, on the layer 4 which improves the cooling effect, which cooling apparatus keeps the security document 9 at a predetermined temperature during the exposure of the security document 9, wherein this low temperature of, for example −60° C. as the temperature for the LIESST effect is intended to prevent undesired molecular chemical changes of the surface element 5 and of the security document 9 overall. A security document generally withstands short-term cooling to lower temperatures, but polycarbonate is no longer usable below −60° C.

It is assumed in FIG. 4 that the lettering "U-NICA" was created with the method illustrated in FIG. 3 by using a first laser 11 or 13 with one of the mentioned alternative procedures. A second laser 12 is arranged opposite the transparent cover layer 5 so as to influence the molecular magnets to return to the LS state through exposure of the functional layer 2 of molecular magnets. Here, the letters "U-NI" have already disappeared from the lettering and only the letters "CA" need to be processed such that the surface element is also provided with the reference sign 5b so as to designate the partial cancellation of the magnetization. The extinguishing laser can, but does not have to, follow the magnetized line, in this case the letter lines of the word U-NICA. It may also act to the left and to the right thereof or scan the entire functional layer, which technically speaking represents the simplest solution.

With respect to FIGS. 3 and 4, it must be noted that the lettering "U-NICA" partially cannot be seen by the naked eye, but comprises or consists of correspondingly magnetically determinable changes of regions in the functional layer 2 which can be determined by suitable measuring devices. SCO is frequently associated with a colour change. This can be hidden by a coloured cover layer, as long as it is sufficiently transmissive for laser beam. In the case of a visible personalization at the same location as the magnetic personalization, this is not an issue.

Figure 5:
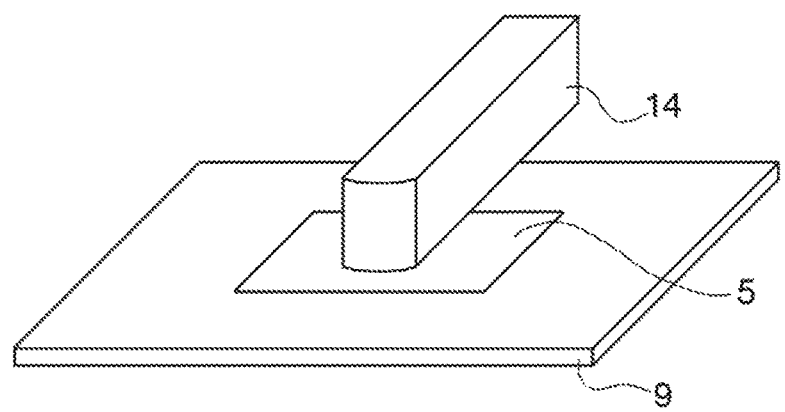
FIG. 5 shows a security document according to FIG. 2 with magnetic information during the visualization of the magnetic field in a corresponding handheld device.

FIG. 5 shows a security document 9 according to FIG. 2 with magnetic information in a surface element 5 during the visualization of the magnetic field with a corresponding handheld device 14. The handheld device 14 is provided to detect and display the presence and arrangement of the molecular magnets in the functional layer 2.

Figure 6:
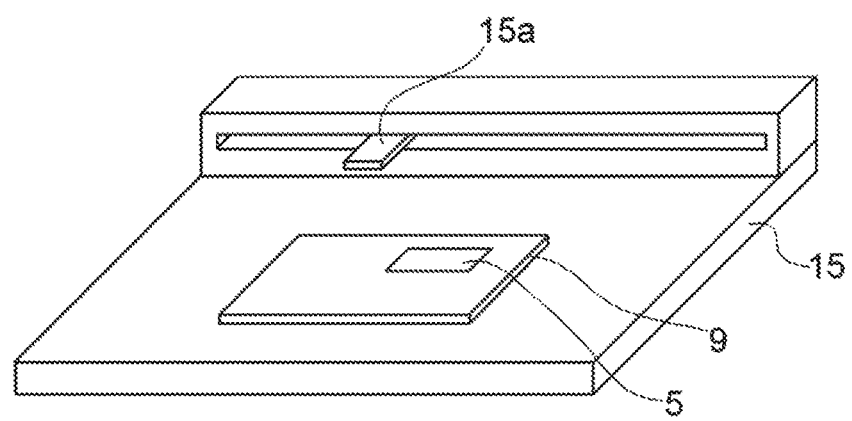
FIG. 6 shows a security document according to FIG. 2 with magnetic information during the two-dimensional recording of the magnetic field using a scanner.

FIG. 6 shows a security document 9 with its integrated surface element 5 according to FIG. 1 with magnetic information during the two-dimensional recording of the magnetic field with a scanner 15. The scanner 15 is designed for detection of the magnetized regions 2 of the surface element 5, optionally provided with a cooled scanner bed (not illustrated). Here, an arm 15a is part of a module for capturing the local susceptibility or magnetization. It is of course also possible to cool during reading. The handheld device illustrated in FIG. 6 does not have this possibility, which limits its use to molecular magnets which are activatable or detectable at room temperature.

Figure 7:
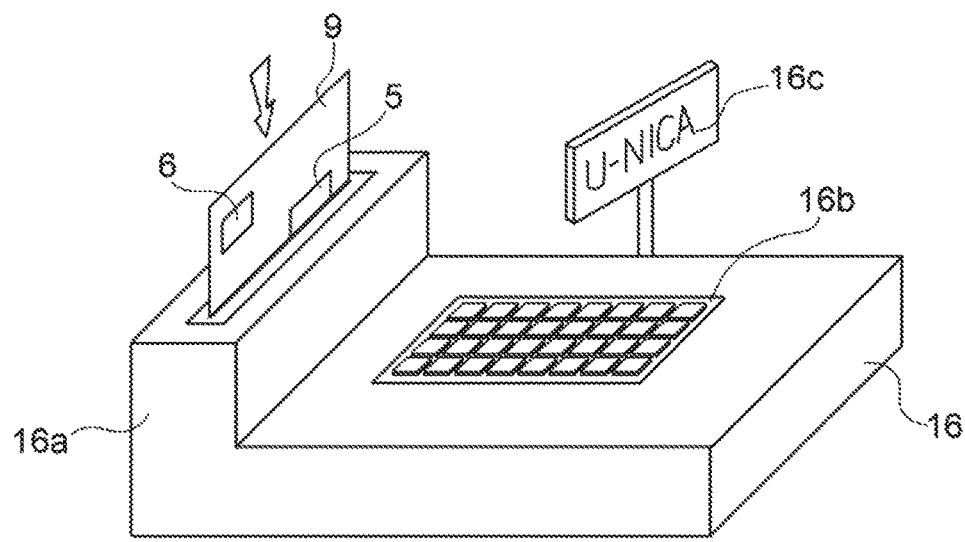
FIG. 7 shows a security document according to FIG. 2, partially inserted into a reading slot of a workstation, which contains all the elements for the imaging capture of the magnetic field.

FIG. 7 shows a security document 9 according to FIG. 1, which has been partially inserted into a reading slot of a workstation 16, wherein this workstation 16 contains all the elements for the imaging capture of the magnetic field. The workstation 16, which is provided in tabletop configuration, has an integrated recording means for the security document 9, wherein the surface element 5 thereof is inserted at least partially in the region of the magnetic scanner.

The workstation 16 comprises a rear device part 16a having a magnetic scanner, with which a security document 9, which has been inserted in a slot of the workstation 16, is examinable. An input unit 16a of the workstation 16 can comprise a keypad or a keypad and mouse or a touchpad etc. A screen 16c is furthermore provided for visual assessment of the magnetic image and for operating the workstation 16. Here, the magnetically read lettering "U-NICA" can be seen on the screen 16C, as it is produced after the completion of the writing step according to FIG. 3.

Other device configurations are of course also conceivable. The device configurations according to FIGS. 5 to 7 are merely examples.

The security document 9 in the form of a card or a card-like personalization sheet consists of a plurality of layers which comprises at least a carrier layer 3 and a layer 2 thereon having the molecules that carry the magnetic function (functional layer). Located on the top of the functional layer 2 (on the side A facing the viewer) is a cover layer 1, which does not necessarily have to be there, but should be transparent for the laser beam of the lasers 11, 12, 13, but not necessarily for the human eye. However, it is a prerequisite that this cover layer 1 does not negatively affect the extent of the magnetic field. Accordingly, a polycarbonate sheet per se is suitable as cover layer 1, but for example not if it were metallized at the location of the magnetic security feature. The rear-side of the card can, if cooling is intended, be provided with a layer 4 which optimizes the cooling effect.

The first exemplary embodiment mentioned is the magnetization step according to FIG. 3 with the first laser 11. Here, the LIESST transition in a coordination compound with metal centres of 3d metals, in particular iron(II), iron(III), nickel(II), chromium(II) or manganese(III), is linked preferably directly with the same metal cations of the same element, but not necessarily of the same oxidation stage, which permits for example the combination both of Fe(II) with Fe(II) and Fe(II) with Fe(III).

The second exemplary embodiment mentioned is the otherwise identical magnetization step according to FIG. 3 with the first laser 11, wherein the LIESST transition takes place in a coordination compound with metal centres of a first type of 3d metals, in particular iron(II), iron(III), nickel(II), chromium(II) or manganese(III), but in combination with a second metal selected from the group of all transition metals, for example the combination of iron(II) with vanadium(IV), and the second metal ions with a spin of $S=\frac{1}{2}$ or above are linked by diamagnetic ligand bridges with the metal centres of the first type. Suitable bridging ligands can be cyanide ligands, but also organic ligands that permit coordination via for example nitrogen or oxygen, wherein either the coupling of the metal ions with the ligands takes place such that one of the two metal ligand bonds does not lead to orbital overlap and a ferromagnetic interaction can come about, or a consistent orbital overlap occurs, that is to say an anti-ferromagnetic interaction between a metal of the first type and the metal of the second type occurs, as long as overall a total spin of the coordination compound is still retained. Across the entire coordination compound, in this second case there is therefore a ferrimagnetic interaction. Coordination spheres with sulphur or phosphorus or other electron donors are also possible.

In both of the above-mentioned exemplary embodiments, it is conceivable to surround the LIESST-capable coordination compound in a host complex with a suitable central ion, for example zinc or manganese, to increase the LIESST transition temperature.

Both exemplary embodiments relate to coordination compounds with 3d metals. However, the solution according to the invention is not limited thereto. Rather, transition metals of higher periods, and also lanthanide central ions, can be suitable.

In both exemplary embodiments, spin trapping is stimulated with a laser with green light, for example an argon ion laser (514.5 nm) or a frequency doubled Nd:YAG laser (532 nm). Excitation into the $^1T_1$ state occurs here. Alternatively, it is also possible to carry out the excitation in the spin-prohibited $^3T_1$ with the aid of a diode laser at 980 nanometers. Switching back into the LS state is carried out for example using a further diode laser at 820 nm (transition from $^5T_2$ to $^5E$ and subsequent multiple radiation-less transition into the diamagnetic $^1A_1$ state). For a compact configuration of the equipment for this photomagnetic switching, it is practical but not absolutely necessary to select a combination of diode lasers that operate at wavelengths of 820 and 980 nm.

To configure a device for visualizing a magnetic field that is common in the security environment, the magnetic individual molecules or groups of individual molecules (clusters) must have an exchange interaction over an extended area or a domain. These domains have a size of 10 nm to 1000 µm, preferably 1 to 100 µm. Coupling is brought about by suitably dense packaging of the magnetic individual molecules or the molecule groups on a carrier, for example as a sheet, or embedded in a host lattice of clathrates or crystal lattices with the cavities of a suitable size, or via vacuum deposition. Alternatively, an extended coordination network on the basis of a two-dimensionally or three-dimensionally cross-linked coordination compound, for example as a polymer or in crystalline form, can serve for forming the domains.

For practical use of the magnetism within the context of the invention to occur, the room temperature lies within the hysteresis window and the relaxation constant of the HS state is in an expedient order of magnitude. An expedient order of magnitude is either

- understood to be an at least partial maintenance of the HS state over a month up to 10 years, if the security document carries information on the basis of molecular magnetization as a permanent feature, or
- an at least partial maintenance in the range of minutes or seconds, if verification of the magnetic feature is to be take place quasi in situ, i.e. immediately during or after irradiation. The magnetic feature in this case as it were responds to a short excitation, a type of optical ping, with a magnetic pulse.

In a purely instrument-based evaluation of the magnetic security feature, if only the direct response of the magnetic feature after a laser stimulation is intended to be captured, a lifetime of the HS state that corresponds to the requirements of the technical system suffices. The lower limit for this lifetime is thus limited by the technical capabilities of the query/response system. A visual check of the magnetization or an instrument-based query/response verification require verification devices which, in addition to the function of the detection of the magnetic field, also have a laser device with lasers of suitable wavelength, output and pulse sequence. For example, magnetic field visualization apparatuses which are typical nowadays can be equipped with laser diodes that meet the requirements. If necessary, an apparatus for producing the magnetism can be provided with a cooling means which cools the security document, for example the ID card, for a short period of time to below the LIESST temperature, for example by bringing a cooled surface into full-area contact with the rear-side surface of the ID card. This cooling device is implementable in stationary or semi-stationary verification devices. In these cases, cooling takes place for example by liquid nitrogen or, if sufficient with respect to the temperature that is to be achieved, also with Peltier elements.

One further embodiment shows the magnetization via a purely thermal SCO using the thermal action of a laser beam. Thermal laser methods in the field of security technology are used for example to produce black-and-white images via carbonization. In this application, an imaging laser can stimulate magnetization for the same document.

An increase in the temperature of the security element and the card to above the Curie point cancels out the macroscopic magnetization and represents an extinguishing operation, even if thermal SCO populates the HS state. Due to the relaxation of the spin system, a temperature increase brings about the velocity constant for the return of the molecular magnets into a diamagnetic ground state. If the molecular magnets do not only permit a photomagnetic transition into the HS state, but also thermal SCO, the spin balance at higher temperatures is shifted in the direction of the HS state, and thus an increased robustness of the magnetic information on the security document is supported.

Finally, a photochemically effected formation of molecules with a stable radical-carrying function is usable as a solution according to the invention.

These laser-supported methods for SCO with the formation of magnetic couplings additionally require a system property that allows a cooperative effect, since otherwise the macroscopic magnetism required by the invention does not come about or is too small to be detected using the detection means which are customary in the security environment.

| LIST OF REFERENCE SIGNS | |
|---|---|
| A | side facing the observer |
| B | rear-side, facing the optional cooling device |
| 1 | transparent cover layer |
| 2 | functional layer with molecular magnets |
| 3 | carrier layer |
| 4 | layer for cooling effect |
| 5 | surface element of the functional layer molecular magnets |
| 5a | partially completed magnetization |
| 5b | partial cancellation of magnetization |
| 6 | surface element with portrait image |
| 7 | surface element with a visible personalization |
| 8 | surface element with a machine-readable personalization |
| 9 | security document |
| 10 | cooling apparatus |
| 11 | first laser (LIESST path) |
| 12 | second laser |
| 13 | first alternative laser (SCO) |
| 14 | handheld device for visualization of a magnetic field |
| 15 | scanner |
| 15a | capturing module of the local susceptibility or magnetization |

| LIST OF REFERENCE SIGNS | |
|---|---|
| 16 | workstation |
| 16a | device part with magnetic scanner |
| 16b | input unit of the workstation |
| 16c | screen |

The invention claimed is:

1. A data carrier having an authenticity feature provided in the data carrier, comprising a magnetic feature which is personalizable under irradiation with a high-energy beam by changing physical and/or chemical properties wherein the magnetic feature is provided as a personalizable second-level feature in a functional layer, which feature is based on an opto-magnetic process which permits writing of information, such that macroscopically measurable magnetism is brought about at the irradiated location, wherein the magnetic feature comprises molecular magnets which have an organic or metal-organic base and are organized in sufficiently large one-dimensional to three-dimensional structures so that ferromagnetism or ferrimagnetism can arise.

2. The data carrier according to claim 1, wherein the macroscopically measurable magnetism of the magnetized second-level feature is cancelled by irradiation with a high-energy beam.

3. The data carrier according to claim 1, wherein owing to the paramagnetism of their metal-organic compounds, the molecular magnets have a total moment of the electronic system of these compounds that results from the total spin of the participating metal ions and the spin coupling of the electronic systems of these ions, wherein the microscopic spin coupling of the metal-organic compounds which are arranged as complexes and give rise to a macroscopically measurable magnetism are based on a supramolecular coupling of the spin of a molecule or a molecule structure.

4. The data carrier according to claim 1, wherein the molecular magnets have a photochemical spin crossover effect (SCO) which is inducible with a high-energy beam.

5. The data carrier according to claim 1, wherein the molecular magnets have a thermal spin crossover effect (SCO) which is induced with a high-energy beam.

6. The data carrier according to claim 1, wherein the data carrier has a rear-side layer which is prepared for cooling.

7. The data carrier according to claim 1, wherein the high-energy beam is a beam of a laser or an electron or neutron beam.

8. The data carrier according to claim 1, wherein the functional layer is covered by a cover layer which is transparent for the high-energy beam and for the feature capturing.

9. The data carrier according to claim 1, wherein the magnetic feature has a magnetic sequence of characters, in particular from the group comprising alphanumeric characters and digital codes such as barcodes, a magnetic image or any other magnetically capturable information.

10. The data carrier according to claim 1, wherein the magnetic feature, as a constituent part of a printing ink, is applied onto a substrate of the data carrier or another layer of the data carrier or is incorporated in a layer, in particular plastic polymer layer, of the data carrier.

11. The data carrier according to claim 10, in which the magnetic feature is located in a layer composed of PVA or PC, wherein this layer is optionally also the top layer of the data carrier.

12. The data carrier according to claim 1, wherein the metal-organic compound is enclosed in a matrix of a polymer material, for example polycarbonate, which surrounds in particular a sufficiently large number of clusters of molecular magnets.

13. The data carrier according to claim 1, comprising a plastics card.

* * * * *